US012279549B2

(12) United States Patent
Liljedahl et al.

(10) Patent No.: US 12,279,549 B2
(45) Date of Patent: Apr. 22, 2025

(54) ROBOTIC WORK TOOL AND METHOD FOR IMPROVED COLLISION HANDLING

(71) Applicant: HUSQVARNA AB, Huskvarna (SE)

(72) Inventors: Dan Liljedahl, Jönköping (SE); Lars Ederfors, Bankeryd (SE); Magnus Bergenholm, Flisby (SE); Daniel Wikestad, Hestra (SE)

(73) Assignee: HUSQVARNA AB, Huskvarna (SE)

(*) Notice: Subject to any disclaimer, the term of this patent is extended or adjusted under 35 U.S.C. 154(b) by 918 days.

(21) Appl. No.: 17/431,926

(22) PCT Filed: Jan. 30, 2020

(86) PCT No.: PCT/EP2020/052310
§ 371 (c)(1),
(2) Date: Aug. 18, 2021

(87) PCT Pub. No.: WO2020/169318
PCT Pub. Date: Aug. 27, 2020

(65) Prior Publication Data
US 2022/0151143 A1    May 19, 2022

(30) Foreign Application Priority Data
Feb. 20, 2019  (SE) .................................. 1950210-3

(51) Int. Cl.
*A01D 34/00*    (2006.01)
*B60W 30/08*    (2012.01)
(Continued)

(52) U.S. Cl.
CPC .......... *A01D 34/008* (2013.01); *B60W 30/08* (2013.01); *G05D 1/0214* (2013.01);
(Continued)

(58) Field of Classification Search
CPC ... A01D 34/008; B60W 30/08; G05D 1/0214; G05D 1/0227
See application file for complete search history.

(56) References Cited

U.S. PATENT DOCUMENTS

| 2008/0276407 A1 | 11/2008 | Schnittman et al. |
| 2017/0188510 A1* | 7/2017 | Einecke ............... A01D 34/008 |

(Continued)

FOREIGN PATENT DOCUMENTS

| CN | 201062056 Y | 5/2008 |
| CN | 104470351 A | 3/2015 |

(Continued)

OTHER PUBLICATIONS

Swedish Office Action and Search Report for Application No. 1950210-3 mailed Aug. 26, 2019.
(Continued)

*Primary Examiner* — Abigail A Risic
(74) *Attorney, Agent, or Firm* — Burr & Forman LLP (57) ABSTRACT

A robotic work tool (100) comprising a chassis (110) and a body (120). The robotic work tool (100) further comprises at least one input unit (170, 180) for receiving input data relating to an operation of the robotic work tool (100), and at least one collision sensor arrangement (140) for detecting a direction of a movement of the chassis (110) with respect to the body (120). The movement is indicative of a collision. The robotic work tool (100) further comprises at least one controller (130) for controlling operation of the robotic work tool (100). The at least one controller (130) is configured to receive, from the at least one input unit (170, 180), said input data relating to the operation of the robotic work tool (100). The at least one controller (130) is further configured to adapt a collision threshold based on said input data relating to the operation of the robotic work tool (100). The collision threshold is related to said movement of the chassis (110)
(Continued)

with respect to the body (120) detected by the at least one collision sensor arrangement (140).

17 Claims, 5 Drawing Sheets

(51) Int. Cl.
    *G05D 1/00*         (2006.01)
    *G05D 1/02*         (2020.01)
    *A01D 101/00*     (2006.01)

(52) U.S. Cl.
    CPC ....... *G05D 1/0227* (2013.01); *A01D 2101/00* (2013.01); *B60W 2030/082* (2013.01)

(56) References Cited

U.S. PATENT DOCUMENTS

| | | | |
|---|---|---|---|
| 2018/0184583 A1 | 7/2018 | Morin et al. | |
| 2019/0265724 A1* | 8/2019 | Sheng | G05D 1/0088 |
| 2019/0307060 A1* | 10/2019 | Hong | B62D 63/04 |
| 2020/0093057 A1* | 3/2020 | Liljedahl | A01D 34/008 |
| 2020/0170180 A1* | 6/2020 | Kong | A01D 34/81 |

FOREIGN PATENT DOCUMENTS

| | | |
|---|---|---|
| CN | 107404839 A | 11/2017 |
| CN | 208085855 U | 11/2018 |
| DE | 102011085565 A1 | 5/2013 |
| JP | 2018014963 A | 2/2018 |
| WO | 2013064301 A1 | 5/2013 |
| WO | 2013125992 A1 | 8/2013 |
| WO | 2018078880 A1 | 5/2018 |
| WO | 2018132048 A1 | 7/2018 |
| WO | 2018174777 A1 | 9/2018 |

OTHER PUBLICATIONS

International Search Report and Written Opinion for International Application No. PCT/EP2020/052310 mailed Apr. 29, 2020.

* cited by examiner

ROBOTIC WORK TOOL AND METHOD FOR IMPROVED COLLISION HANDLING

TECHNICAL FIELD

This disclosure relates to robotic work tools and in particular to a robotic work tool and a method for improved collision handling.

BACKGROUND

A robotic work tool is an autonomous robot apparatus that is used to perform certain tasks, for example for cutting lawn grass. A robotic work tool is typically assigned an area, hereinafter referred to as a work area, in which the robotic work tool is intended to operate. This work area may be defined by the perimeter enclosing the work area. This perimeter may include the borders, or boundaries, which the robotic work tool is not intended to cross. The robotic work tool is typically configured to work within this work area in a random pattern. As such, it does not take into account obstacles or objects, such as trees, furniture and walls inside this area and in order to avoid the robotic work tool from simply stopping when an object or obstacle is encountered, various collision sensor arrangements have been developed. These collision sensor arrangements enable the robotic work tool to detect that it has collided with an object and in turn adapt its operation accordingly, i.e. turn away from the object so that the robotic work tool can continue its operation.

Even if these collision sensor arrangements generally have improved the operation of robotic work tools and have overcome many disadvantages, the inventors have realized that the use of such collision sensor arrangements could be improved in order for the robotic work tools to react with a higher degree of accuracy. The inventors have realized that there is a need for improved collision handling for robotic work tools.

SUMMARY

As mentioned in the background section, the inventors of the various embodiments have realized, after insightful and inspired reasoning, that there is a need for improved collision handling for robotic work tools. It is important that the robotic work tool only react to collisions when it is intended to, such that the number of false collision detections may be reduced. A collision should only be detected when a collision actually occurs. In order to achieve this, the inventors have realized that there are factors that may affect the sensitivity of the collision detections. These factors relate to an operation of the robotic work tool and to a direction of a movement indicative of a collision. By taking at least these factors into account when the robotic work tool is operating within a work area, improved collision handling is provided and it is possible to prevent, or at least reduce, incorrect operation of the robotic work tool. Consequently, the overall operation of the robotic work tool is improved. Furthermore, by providing a robotic work tool that further takes into account factory faults or misalignments of the collision sensor arrangement, the amount of false detections is even further reduced and a more flexible collision handling is provided.

In view of the above, it is therefore a general object of the aspects and embodiments described throughout this disclosure to provide a solution for improved collision handling.

This general object has been addressed by the appended independent claims. Advantageous embodiments are defined in the appended dependent claims.

According to a first aspect, there is provided a robotic work tool for improved collision handling.

In one exemplary embodiment, the robotic work tool comprises a chassis and a body. The robotic work tool further comprises at least one input unit for receiving input data relating to an operation of the robotic work tool, and at least one collision sensor arrangement for detecting a direction of a movement of the chassis with respect to the body. The movement is indicative of a collision. The robotic work tool further comprises at least one controller for controlling operation of the robotic work tool. The at least one controller is configured to receive, from the at least one input unit, said input data relating to the operation of the robotic work tool. The at least one controller is further configured to adapt a collision threshold based on said input data relating to the operation of the robotic work tool. The collision threshold is related to said movement of the chassis with respect to the body detected by the at least one collision sensor arrangement.

In one embodiment, the at least one controller further is configured to receive, from the at least one collision sensor arrangement, a reference collision value. The reference collision value is representative of a position of the chassis with respect to the body when no movement is detected. The at least one controller is further configured to set the collision threshold based on said reference collision value. For example, the at least one controller may be configured to receive the reference collision value only upon reception of an activation signal.

In one embodiment, the at least one controller is further configured to receive, from the at least one collision sensor arrangement, the direction of the movement of the chassis with respect to the body. Thereafter, the at least one controller is configured to determine that a collision has been detected by comparing the relative movement of the body and the chassis to the collision threshold. For example, the at least one controller may further be configured to control the robotic work tool to navigate from a location where a collision was detected based on the direction of the movement of the body with respect to the chassis.

In one embodiment, the robotic work tool comprises at least two collision sensor arrangements for detecting a direction of a movement of the chassis with respect to the body. At least one of the collision sensor arrangements may be located in a front part of the robotic work tool and at least one of the collision sensor arrangements may be located in a rear part of the robotic work tool. For example, the at least two collision sensor arrangements may be configured to have different collision thresholds and the at least one controller may be configured to adapt the collision threshold for each of the at least two collision sensor arrangements independently.

In one embodiment, the robotic work tool comprises at least two input units for receiving different respective types of input data relating to the operation of the robotic work tool. The controller is configured to adapt the collision threshold based on a combination of said input data relating to the operation of the robotic work tool from said at least two input units.

In one embodiment, the at least one input unit is a memory for receiving a preset input data.

In one embodiment, the at least one input unit is a sensor input unit for collecting sensed input data. The sensor input unit may be configured to sense a local environment external to the robotic work tool. The controller may be configured to adapt the collision threshold based on input sensed from the local environment external to the robotic work tool.

In one embodiment, the input data relating to an operation of the robotic work tool is representative of a speed of the robotic work tool and/or a property of a work area, such as a grass height, a slope inclination, and/or a measure of flatness of the terrain.

In one embodiment, the controller is further configured to adapt the collision threshold in accordance with a dynamically scaled limit. In another embodiment, the controller is further configured to adapt the collision threshold in accordance with preset levels.

In one embodiment, the robotic work tool is a robotic lawn mower.

According to a second aspect, there is provided a method implemented by the robotic work tool according to the first aspect.

In one exemplary implementation, the method is for use in a robotic work tool. The robotic work tool comprises a chassis and a body. The method comprises receiving, from at least one input unit, input data relating to the operation of the robotic work tool and adapting, by at least one controller, a collision threshold based on said input data relating to the operation of the robotic work tool. The collision threshold is related to a movement of the chassis with respect to the body detected by at least one collision sensor arrangement.

In one embodiment, the method further comprises receiving, from the at least one collision sensor arrangement, a reference collision value. The reference collision value is representative of a position of the chassis with respect to the body when no movement is detected. The method further comprises setting, by the at least one controller, the collision threshold based on said reference collision value.

In one embodiment, the method further comprises receiving, from the at least one collision sensor arrangement, the direction of the movement of the chassis with respect to the body, and determining, by the at least one controller, that a collision has been detected by comparing the relative movement of the body and the chassis to the collision threshold. The method may further comprise controlling, by the at least one controller, the robotic work tool to navigate from a location where a collision was detected based on the direction of the movement of the body with respect to the chassis.

In one embodiment, the robotic work tool comprises at least two collision sensor arrangements for detecting a direction of a movement of the chassis with respect to the body, and the method further comprises adapting, by the at least one controller, the collision threshold for each of the at least two collision sensor arrangements independently.

In one embodiment, the robotic work tool comprises at least two input units for receiving different respective types of input data relating to the operation of the robotic work tool and the method further comprises adapting, by the at least one controller, the collision threshold based on a combination of said input data relating to the operation of the robotic work tool from said at least two input units.

According to a further aspect, there is provided a robotic work tool comprising a chassis and a body. The robotic work tool further comprises at least one collision sensor arrangement for detecting a direction of a movement of the chassis with respect to the body. The movement is indicative of a collision. The robotic work tool further comprises at least one controller for controlling operation of the robotic work tool. The at least one controller is configured to receive, from the at least one collision sensor arrangement, a reference collision value. The reference collision value is representative of a position of the chassis with respect to the body when no movement is detected. The at least one controller is further configured to set a collision threshold with reference to said reference collision value. The collision threshold is related to a movement of the chassis with respect to the body detected by the at least one collision sensor arrangement.

Some of the above embodiments eliminate or at least reduce the problems discussed above. By taking into account input data relating to an operation of the robotic work tool in combination with a direction of a movement indicative of a collision when the robotic work tool is operating within a work area, an improved robotic work tool for handling collisions is provided.

BRIEF DESCRIPTION OF DRAWINGS

These and other aspects, features and advantages will be apparent and elucidated from the following description of various embodiments, reference being made to the accompanying drawings, in which.

DETAILED DESCRIPTION

The robotic work tool according to the present disclosure will now be described more fully hereinafter. The robotic work tool according to the present disclosure may however be embodied in many different forms and should not be construed as limited to the embodiments set forth herein. Rather, these embodiments are provided by way of example so that this disclosure will be thorough and complete, and will fully convey the scope of the present disclosure to those persons skilled in the art. Same reference numbers refer to same elements throughout the description.

In one of its aspects, the disclosure presented herein concerns a robotic work tool for improved collision handling.

The robotic work tool may be realised in many different ways. While the present disclosure will mainly be described in general terms of an autonomous robot designed for mowing a lawn, it should be understood that the robotic work tool described herein may be implemented into any type of autonomous machine that may perform a desired activity within a desired working area, including without limitation a cleaning robotic work tool, a polishing work tool, repair work tool and/or demolition work tool or the like.

Figure 1A:
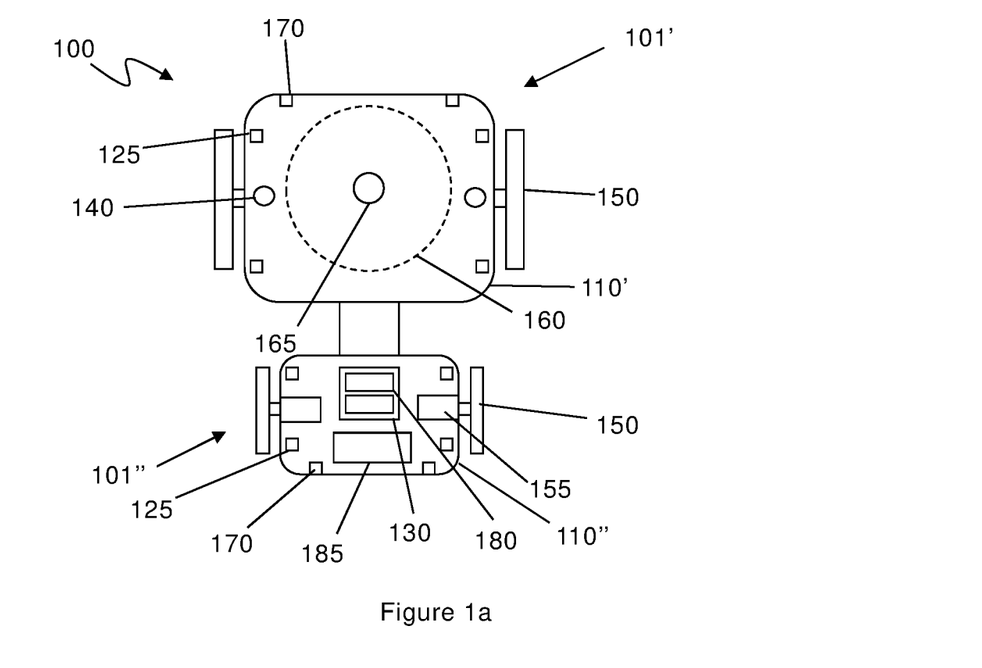
FIG. 1a shows a schematic overview of a robotic work tool.
Figure 1B:
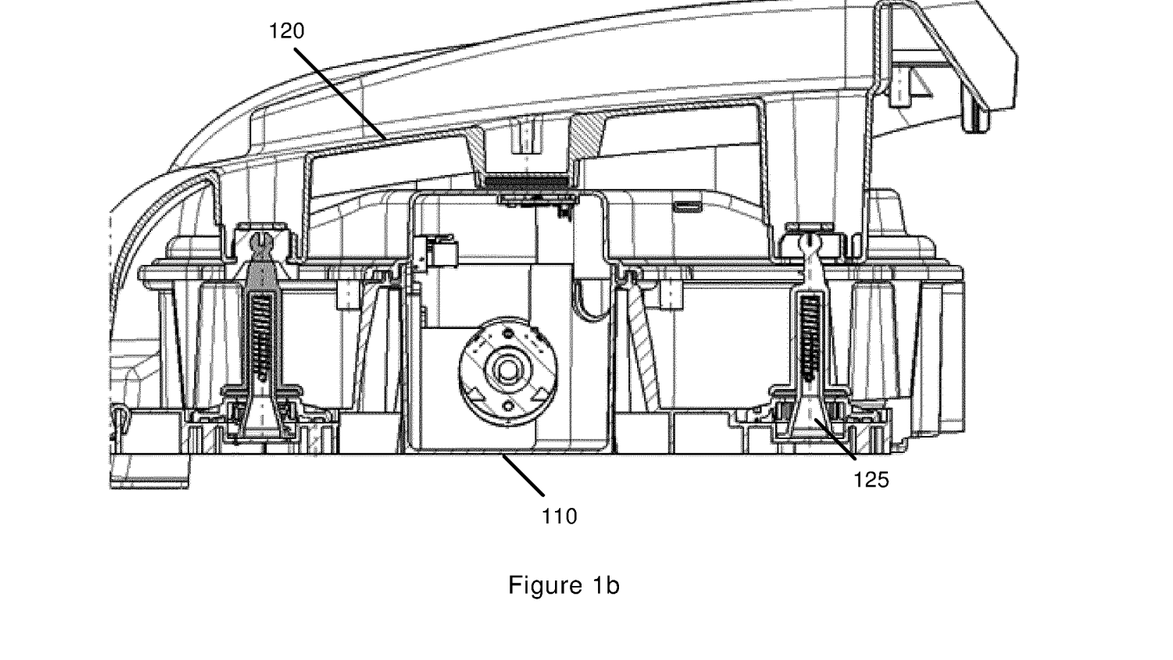
FIG. 1b shows a cross-sectional view of a portion of a robotic work tool.

FIG. 1a shows a schematic overview of the robotic working tool 100, which is exemplified by a robotic lawnmower 100, having a front carriage 101' and a rear carriage 101". The robotic lawnmower 100 comprises a chassis 110, which in the embodiment shown in FIG. 1a comprises a front chassis 110' of the front carriage 101' and a rear chassis 110" of the rear carriage 101". The robotic work tool 100 further comprises a body 120. The body is illustrated in FIG. 1b where the robotic work tool 100 is shown in a perspective side view. The body 120, which may be made of plastic or metal, forms a protective outer cover or housing of the robotic work tool 100 and protects components, such as motors and controller(s), which are located within the body 120 or on the chassis 110.

Figure 1C:
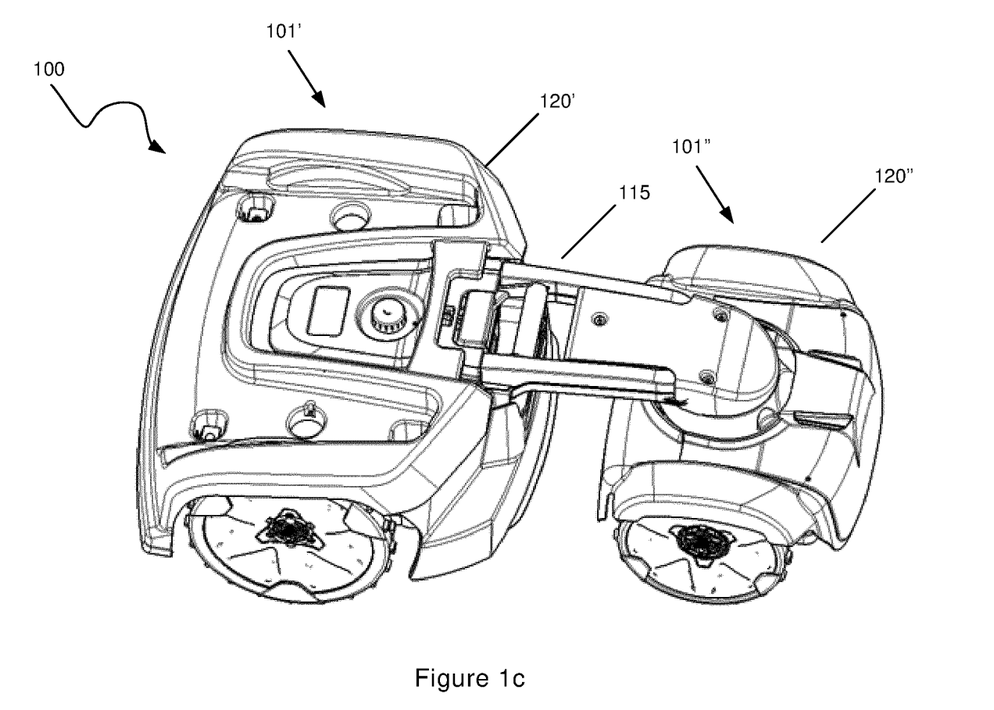
FIG. 1c shows an exemplary view of a robotic working tool.

With reference to FIG. 1c, the body 120 of the robotic work tool may comprise a front body 120' of the front carriage 101' and a rear body 120" of the rear carriage 101". The front carriage 101' and the rear carriage 101" may be coupled by a shaft 115 that is rotationally attached to the rear carriage 101" and fixedly attached to the front carriage 101'. It is appreciated that the present disclosure is not limited to a robotic work tool 100 having separate front and rear carriages 101', 101". Rather, the robotic work tool 100 may also be of type that comprises one single integral chassis and one single integral body. Therefore, in the following description, when it is not necessary to differentiate between a front and rear carriage, reference will only be made to "chassis 110" or "body 120".

As illustrated in FIG. 1b, the body 120 is movably supported on the chassis 110 by suspension devices 125. The body 120 may therefore move laterally relative the chassis 110 when subjected to a collision with an object (not shown) in the surroundings of the robotic work tool 100. The body may 120 may also move vertically relative the chassis 110 subjected to lift. For example, when a person grabs hold of the body 120 and lifts it upwards.

The robotic working tool 100 comprises a plurality of wheels 150. In the exemplary embodiment of FIG. 1a, the robotic working tool 100 comprises two pair of wheels 150. One pair of front wheels 150 is arranged in the front carriage 101' and one pair of rear wheels 150 is arranged in the rear carriage 101". At least some of the wheels 150 are drivably connected to at least one electric motor 155. It is appreciated that combustion engines may alternatively be used, possibly in combination with an electric motor.

As illustrated in FIG. 1a, each of the rear wheels 150 may be connected to a respective electric motor 155. This allows for driving the rear wheels 150 independently of one another, which, for example, enables steep turning.

The robotic work tool 100 also comprises at least one controller 130. The controller 130 may be implemented using instructions that enable hardware functionality, for example, by using executable computer program instructions in a general-purpose or special-purpose processor that may be stored on a computer readable storage medium (disk, memory etc.) to be executed by such a processor. The controller 130 is configured to read instructions from the memory 180 and execute these instructions to control the operation of the robotic work tool 100 including, but not being limited to, the propulsion of the robotic work tool 100. The controller 130 may be implemented using any suitable processor or Programmable Logic Circuit (PLC). The memory 180 may be implemented using any commonly known technology for computer-readable memories such as ROM, RAM, SRAM, DRAM, FLASH, DDR, SDRAM or some other memory technology.

Figure 2:
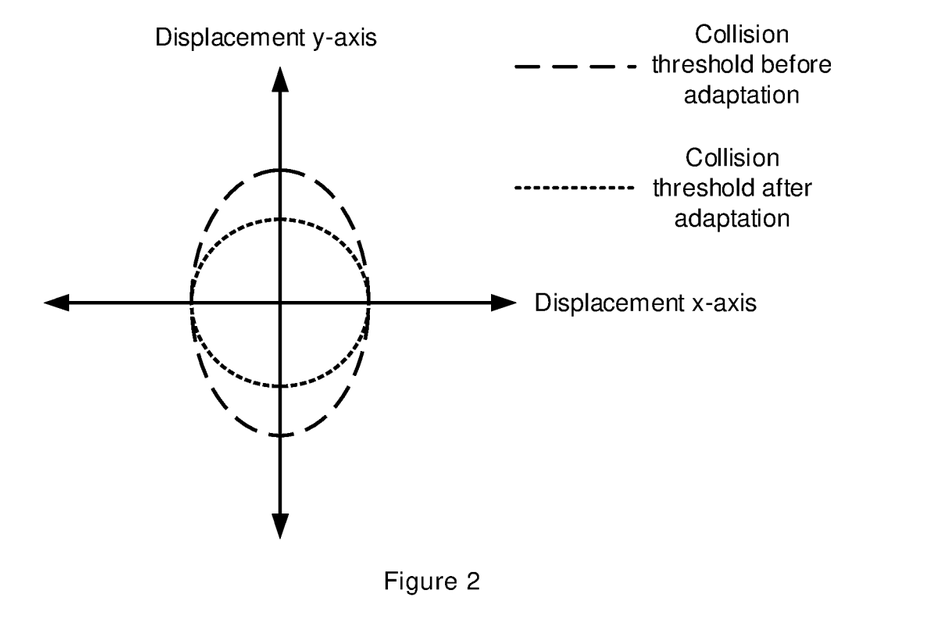
FIG. 2 is a schematic illustration of a collision threshold.

The robotic work tool 100 is also arranged with at least one collision sensor arrangement 140. An example of such collision sensor arrangement 140 will be described with reference to FIGS. 2a and 2b. The at least one collision sensor arrangement 140 is connected to the controller 130, and the controller 130 may be configured to process and evaluate any signals received from the at least one collision sensor arrangement 140. The at least one collision sensor arrangement 140 is configured to detect a direction of a movement of the chassis 110 with respect to the body 120 of the robotic work tool 100. The movement is indicative of a collision. The movement may also be indicative of a lift of the robotic work tool 100, i.e. the collision sensor arrangement 140 may detect a direction of a movement in any direction.

As illustrated in FIG. 1a, the robotic work tool 100 may also comprise a work tool 190, which may include a grass cutting device 160. The grass cutting device 160 may comprise a rotating blade driven by a cutter motor 165. The cutter motor 165 may be connected to the controller 130, which enables the controller 130 to control the operation of the cutter motor 165. The controller 130 may also be configured to determine the load exerted on the rotating blade, by for example measure the power delivered to the cutter motor 165 or by measuring the axle torque exerted by the rotating blade. The robotic work tool 100 also has (at least) one battery 185 for providing power to the motors 155 and the cutter motor 165.

According to the present disclosure, the robotic work tool 100 further comprises at least one input unit. The at least one input unit is configured to receive input data relating to an operation of the robotic work tool 100. The input data may, for example, relate to the activity of the robotic work tool 100 and/or relate to an environment that the robotic work tool 100 is operating within. The input data relating to the operation of the robotic work tool 100 may be representative of, for example, a speed of the robotic work tool 100. Additionally, or alternatively, the input data relating to the operation of the robotic work tool 100 may be representative of a property of a work area, such as a grass height, a slope inclination, and/or a measure of flatness of the terrain. The type of the received input data may depend on the type of input unit. Different types of input data may disclose different information related to the operation of the robotic work tool 100.

In one embodiment, the at least one input may be a memory 180 for receiving a preset input data. The preset input data may relate to, for example, the speed of the robotic work tool 100, i.e. the speed with which the robotic work tool 100 should travel and operate in the work area. The input data may be preset from the factory producing the robotic work tool 100 or a user operating the robotic work tool 100 may input it into the memory 180. Additionally, or alternatively, the at least one input unit may be a sensor input unit 170 for collecting sensed input data. The collected sensed input data may be obtained, by the at least one sensor input unit 170, by for example sensing local terrain features and the collected sensed input data may for example be, without limitations, photo data, odometric data, load data, position data etc.

Based on the received input data relating to the operation of the robotic work tool 100, the at least one controller 130 is further configured to adapt a collision threshold. The collision threshold is related to the movement of the chassis 110 with respect to the body 120 detected by the at least one collision sensor arrangement 140.

By the proposed robotic work tool 100, it is possible to adjust the sensitivity of the collision sensor arrangement 140, i.e. adjust how much movement of the chassis 110 with respect to the body 120 that should occur in a direction before a collision is indicated. When the input data relating to the operation of the robotic work tool 100 indicates that the robotic work tool 100 currently is in a situation where it is preferred that the sensitivity for collision detection is high, the collision threshold will be adjusted to be lower. This will result in that a potential collision is detected even if only a small movement of the chassis 110 with respect to the body 120 occurs. Additionally, in situations where it is preferred that the sensitivity for collision detection is low, the collision threshold will be adjusted to be higher. This adjustment of the collision threshold may prevent, or at least reduce, the detection of false collisions.

Furthermore, as the direction of the movement of the chassis 110 with respect to the body 120 is detected, the collision handling is further improved. With the proposed embodiment, it may be possible to provide a collision threshold that may be adapted differently in different directions depending on the received input data related to the operation of the robotic work tool 100. For example, when the input data related to the operation of the robotic work tool 100 indicates that the operation has changed, the collision threshold may be adapted differently in different directions of the movement of the chassis 110 with respect to the body 120. FIG. 2 illustrates an example of such an adaptation of the collision threshold. As seen in FIG. 2, at a first operation of the robotic work tool 100, a movement along the y-direction, i.e. in a forward or backward direction of the robotic work tool 100, may be larger before a collision is indicated than a movement along the x-direction, i.e. in a side direction. When the at least one controller 130 receives input data that indicates that the operation of the robotic work tool 100 has changed, for example that the speed of the robotic work tool 100 has increased, the collision threshold is adapted accordingly. The decreased speed should not affect the sensitivity of the collision threshold in an x-direction, but it should affect the sensitivity of the collision threshold in the y-direction. Thus, the collision threshold is adapted to achieve a higher sensitivity, i.e. the collision threshold is decreased, in a y-direction, while the collision threshold is left unchanged in the x-direction. This will evens out the collision threshold and make the robotic work tool 100 equally sensitive for collisions in all directions at this second operation. Accordingly, a robotic work tool with a more flexible collision handling is provided.

The at least one controller 130 of the robotic work tool 100 may, according to one embodiment, further be configured to receive, from the at least one collision sensor arrangement 140, the direction of the movement of the chassis 110 with respect to the body 120. The at least one controller 130 may thereafter determine that a collision has been detected by comparing the relative movement of the body 120 and the chassis 110 to the collision threshold.

Figure 3:
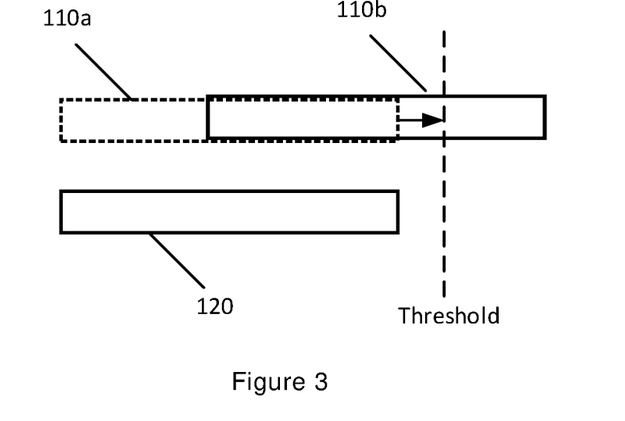
FIG. 3 is a schematic illustration of a collision detection.

An example embodiment of when it is determined that a collision has been detected is now going to be described with reference to FIG. 3. FIG. 3 is a schematic illustration of the chassis 110 and the body 120 of the robotic work tool 100. The dotted square 110a represents the chassis 110 before any movement of the chassis 110 with respect to the body 120 has occurred. The square with the solid line 110a represents the chassis 110 after that a movement has occurred. If the chassis 110 is moved such that the threshold line, marked in the figure as a dotted line, is crossed, the relative movement of the chassis 110 and the body 120 is so large that it is determined that a collision has been detected. In FIG. 3 the chassis 110 is illustrated to be moved in relation to the body 120, but it may also be the other way around, that the body 120 is moved in relation to the chassis 110. Alternatively, both the chassis 110 and the body 120 may be moved in relation to each other.

Accordingly, by using a collision threshold to which the relative movement is compared, it may be prevented that small relative movements are falsely detected as collisions. Examples of such small movements may occur when the robotic work tool 100 runs over a bump or uneven ground. Thus, an improved robotic work tool 100 with more accurate collision detections is achieved. By taking input data relating to the operation of the robotic work tool in combination with a direction of a movement indicative of a collision into account when determining that a collision has occurred, an improved robotic work tool for handling collisions is provided.

Figure 4A:
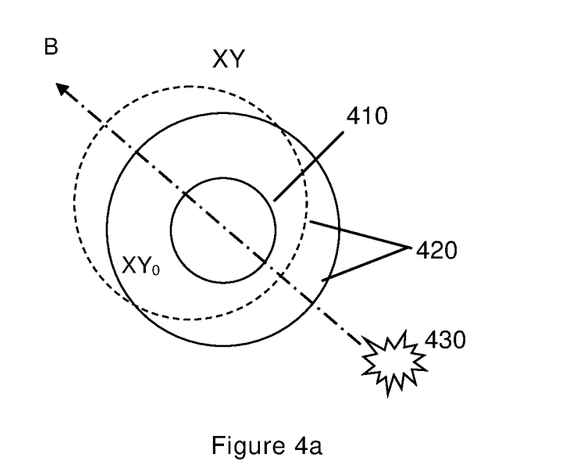
FIGS. 4a and 4b illustrate an exemplary collision sensor arrangement.

According to one embodiment, the collision sensor arrangement 140 may comprise at least one three-dimensional sensor arrangement 140 for detecting relative movement of the body 120 and the chassis 110. An example of such a collision sensor arrangement 140 is illustrated in FIG. 4a. The three-dimensional sensor arrangement 140 may comprise a sensor element 410 and a detection element 420. The sensor element 410 may be arranged on, or in, one of the body 120 and the chassis 110. The detection element 420 may be arranged in, or on, the other of the body 120 and the chassis 110. Preferably, the sensor element 410 is arranged in a water sealed space of the chassis 110 so that it is protected from moisture and contamination. The sensor element 410 is configured to sense i.e. detect the position of the detection element 420 in three dimensions. That is, in three spatial dimensions. In detail, the sensor element 410 is configured to sense the lateral position of the detection element 420 relative the sensor element 410. That is, the position of the detection element 420 in a plane XY which is parallel to the sensor element 410. Additionally, the sensor element 410 is configured to sense the vertical position of the detection element 420 relative the sensor element 410. That is, the position of the detection element 420 along a normal between the detection element 420 and the sensor element 410, i.e. in a plane Z. The sensor element 410 senses continuously or intermittently the position of detection element 420 during operation of the robotic work tool 100, and may thus detect any movement of the detection element 420 relative the sensor element 410.

The sensor element 410 is preferably a three-dimensional sensor that is configured to detect a magnetic field in a plane or in a direction (e.g. an axis) which is normal to the plane. The three-dimensional sensor element 410 may be a three-dimensional Hall-sensor. For example, the three-dimensional sensor 410 may be TLV493 three-dimensional sensor, which is commercially available from the company Infineon Technologies AG. An example of a detection element 420 is a magnet, for example a permanent magnet.

In FIG. 4a, the sensor arrangement 140 is viewed from above. The solid central circle 410 indicates the sensor element 410 and the solid dashed circle 410 indicates the detection element 420 in a lateral default position $XY_0$ in which the detection element 420 is centred over the sensor element 410. The dashed circle 420 indicates a situation in which the detection element 420 has moved laterally in a plane XY relative sensor element 410. The arrow B indicate the direction of the lateral movement of the detection element 420 relative the sensor element 410. Thus, FIG. 4a shows a situation in which the body 120 (not shown) of the robotic work tool 100 has been subjected to collision at location 430 on the body 120 and moved laterally in the XY-plane in direction of arrow B away from the location of the collision 430.

Figure 4B:
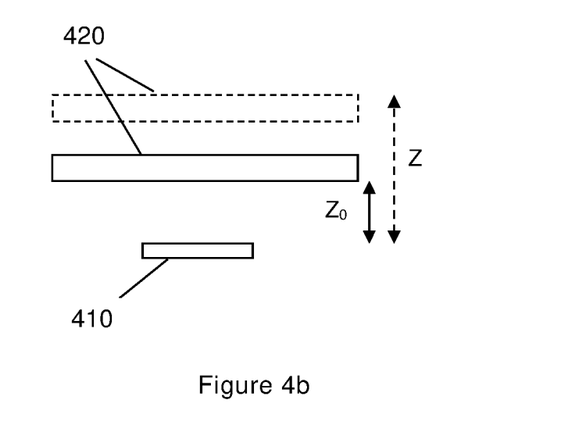

FIG. 4b shows schematically the sensor arrangement 420 of FIG. 4a in a side view. The solid box 420 indicates the detection element 420 in a vertical default position $Z_O$ relative the sensor element 410. The dashed box 420 indicates a situation in which the detection element 420 has moved vertically relative the sensor element 410 along the normal Z due to lifting of body 120 (not shown) of the robotic work tool 100.

In one embodiment, the at least one controller 130 may further be configured to receive, from the at least one collision sensor arrangement 140, a reference collision value. The reference collision value is representative of a position of the chassis 110 of the robotic work tool 100 with respect to the body 120 when no movement is detected. Thus, the reference collision value may be a kind of initial value, or calibration value. The at least one controller 130 may be configured to thereafter set the collision threshold based on said reference collision value.

Figure 5:
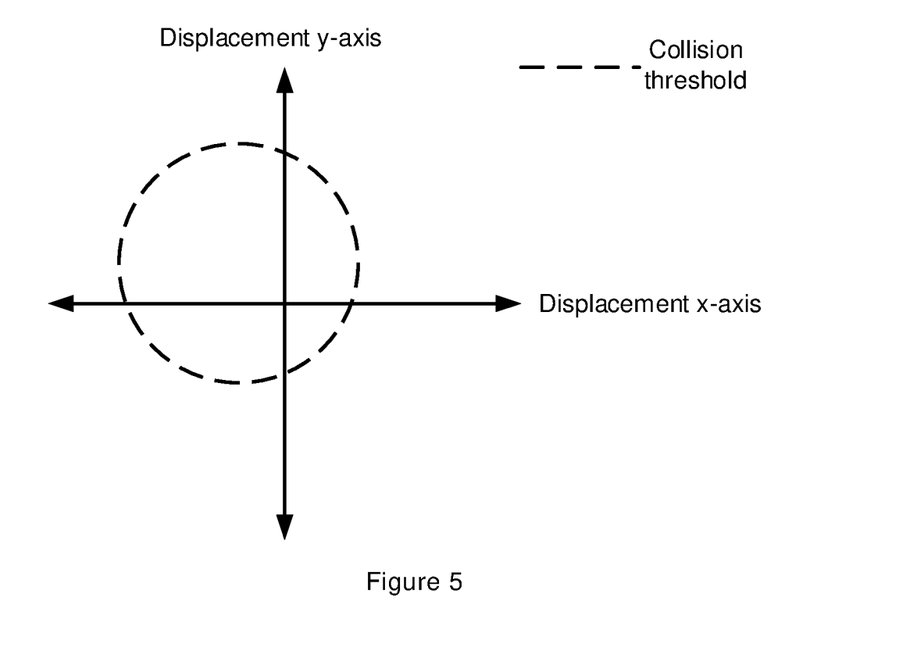
FIG. 5 shows a schematic diagram of a collision threshold calibration.

According to the proposed embodiment, the collision threshold may be set to disregard misalignments between the body 120 and the chassis 110 of the robotic work tool 100, i.e. when the body 120 and the chassis 110 are not completely in line with each other at an initial state. The misalignment between the body 120 and the chassis 110 is thus compensated for and the number of false collision detections due to such a misalignment are reduced. In order to illustrate this, an example where the collision threshold has been compensated is illustrated in FIG. 5. The collision threshold reflects the misalignment and the collision threshold is set such that the movement between the body 120 and the chassis 110 indicates a collision only when they have moved sufficiently in relation to the initial misalignment. By this, possible mechanical tolerance issues, faults in the at least one collision sensor arrangement 140, may be sorted out. Accordingly, a robotic work tool 100 with a more flexible collision handling is provided.

In one embodiment, the at least one controller 130 is further configured to receive the reference collision value only upon reception of an activation signal. Accordingly, as soon as the at least one controller 130 receives an activation signal, the at least one controller 130 may be configured to receive a reference collision value and to set the collision threshold based on the received reference collision value. The activation signal may, for example, be created by a user when the user wishes to perform a calibration of the collision threshold. Such activation signal may, for example, be received, by the robotic work tool 100, by a hardware button being activated. The calibration of the collision threshold may, for example, be needed after that the robotic work tool 100 has been assembled or reassembled. Additionally, or alternatively, the activation signal may be received, by the at least one controller 130, every time the robotic work tool 100 is started.

By the above proposed embodiment, it may be possible to calibrate the collision threshold several times. Furthermore, it may be possible to set the collision threshold if the robotic work tool has experienced an event that may have affected the position of the chassis 110 with respect to the body 120. Examples of such events may be major collisions or service at a workshop.

In one embodiment, when the at least one controller 130 of the robotic work tool 100 has determined that a collision has been detected, the at least one controller 130 may further be configured to control the robotic work tool 100 to navigate from a location where the collision was detected based on the direction of the movement of the body 120 with respect to the chassis 110. Thus, the at least one controller 130 may use the directional information received from the at least one collision sensor arrangement 140 to determine the direction of the colliding force. The at least one controller 130 may adapt the operation of the robotic work tool 100 accordingly, such as by instructing the motor 155 to reverse, and then perform a turn thereby turning the robotic work tool 100 away from the object it has collided with so that operation may continue elsewhere.

Figure 6:
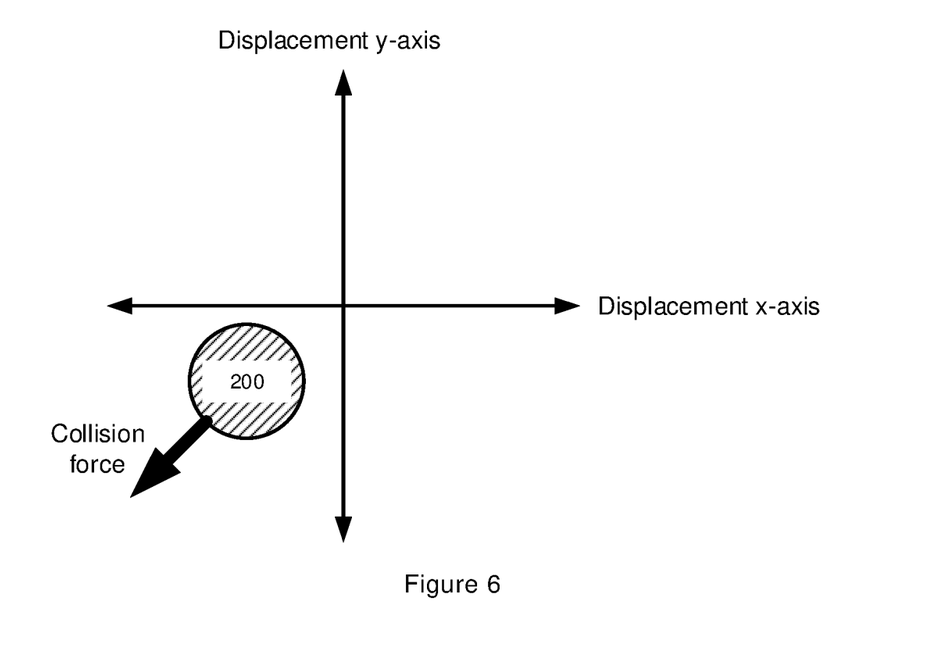
FIG. 6 shows a schematic diagram of detection of collision force in x, y plane.

FIG. 6 illustrates an example embodiment with relation to the previously described embodiment. As seen in FIG. 6, a collision is detected by the collision sensor arrangement 140. By utilizing the displacement of the chassis 110 with respect to the body 120, directional information may be obtained and it may be possible to determine the collision force and direction. By utilizing this directional information, it may thus be possible for the robotic work tool 100 to make better decisions on how to avoid obstacles it has collided with. By avoiding the obstacles that the robotic work tool 100 has collided with, the risk of the robotic work tool 100 to collide with the same obstacles again may be reduced.

In one embodiment, the robotic work tool 100 may comprise at least two collision sensor arrangements 140 for detecting a direction of a movement of the chassis 110 with respect to the body 120. At least one of the collision sensor arrangements 140 may, for example, be located in a front part of the robotic work tool 100 and at least one of the collision sensor arrangements 140 may, for example, be located in a rear part of the robotic work tool 100. Accordingly, each of the front carriage 101' and the rear carriage 101' of the robotic work tool 100 may be provided with at least one collision sensor arrangement 140. Thus, it may be possible to, in a more reliable way, locate collisions originating from different sides of the robotic work tool 100. Directions of movement of the chassis 110 with respect to the body 120 may be received from several collision sensor arrangements 140, and it may further be possible to compare these directions against each other to receive more information from the indicated collision. Even if the present embodiment is described to comprise two collision sensor arrangement 140, it may be appreciated that the numbers of collision sensor arrangements may be more than two.

The at least two collision sensor arrangements 140 may, according to one embodiment, be configured to have different collision thresholds and the at least one controller 130 may be configured to adapt the collision threshold for each of the at least two collision sensor arrangements 140 independently. Accordingly, it may be possible to have different sensitivities associated with the different collision sensor arrangements 140. For example, in some situations it may be preferred to have a higher sensitivity, i.e. a lower collision threshold, in a front part of the robotic work tool 100, as this may indicate that the robotic work tool 100 is driving straight onto something. At the same time, it may be suitable to have a lower sensitivity, i.e. a higher collision threshold, within a rear part of the robotic work tool 100 as collisions registered by the rear part in some situations may not be considered as critical. For example, a light push on the rear part of the robotic work tool 100 should not affect the operation of the robotic work tool 100. In an alternative example, the front part of the robotic work tool 100 may have a higher collision threshold than the rear part, as the front part of the robotic work tool 100 may be more likely to hit obstacles than the rear part. As the rear part of the robotic work tool 100 may be more unlikely to hit obstacles, the robotic work tool 100 may be configured to react quicker when a collision actually is registered by the rear part.

In one embodiment, the robotic work tool 100 may comprise at least two input units 170, 180 for receiving different respective types of input data relating to the operation of the robotic work tool 100. The at least one controller 130 may be configured to adapt the collision threshold based on a combination of said input data relating to the operation of the robotic work tool 100 from said at least two input units 170, 180. Thus, it may be possible to use information from several input units, reflecting different aspects related to the operation of the robotic work tool 100, for adaptation of the collision threshold and a robotic work tool 100 with improved collision handling is provided.

In one embodiment, the input data relating to an operation of the robotic work tool 100 may comprise information about the speed of the robotic work tool 100. This input data may, as explained before, be received from an input unit represented by a memory 180. Alternatively, the speed of the robotic work tool 100 may be received from the motor 155. At a low speed, the collision threshold may, for example, be adjusted to be low, i.e. high sensitivity, which will decrease the response time for the robotic work tool 100. Accordingly, if the robotic work tool 100 is driven by a low speed, it will react faster if it is colliding with something, avoiding potential damages due to collisions. Alternatively, the collision threshold may be adjusted to be high at a low speed. Then the robotic work tool 100 will not be as sensitive for collisions and may, for example, be better at handling uneven terrains. In a corresponding example, when the speed is high, the collision threshold may preferably be set to have a low value, i.e. have a high sensitivity, because when the robotic work tool 100 travels at a high speed the robotic work tool 100 will collide harder. Thus, by adjusting the threshold to be lower at high speed, the collision force will be reduced.

In one example, the collected sensed input data may comprise load exerted on the robotic work tool's cutting blade. By receiving data from the cutter motor 165, it may be possible to determine that the grass is tall, which may result in that the collision threshold should be increased, i.e. the sensitivity should be lowered. Longer grass may possibly be caught in the frame of the robotic work tool 100, which may move the chassis 110 with respect to the body 120 and consequently creating false collision detections. Accordingly, by taking load exerted on the robotic work tool's cutting blade into account when adapting the collision threshold may reduce false detections and thus improve the collision handling of the robotic work tool 100. The collected sensed input data may additionally, or alternatively, comprise a measure of flatness of the terrain. If the terrain is very uneven, this may cause a number of false detections due to the shaking of the frame of the robotic work tool 100 if this input data is not taken into consideration. However, by using this input data, the amount of false detections may be reduced.

Figure 7:
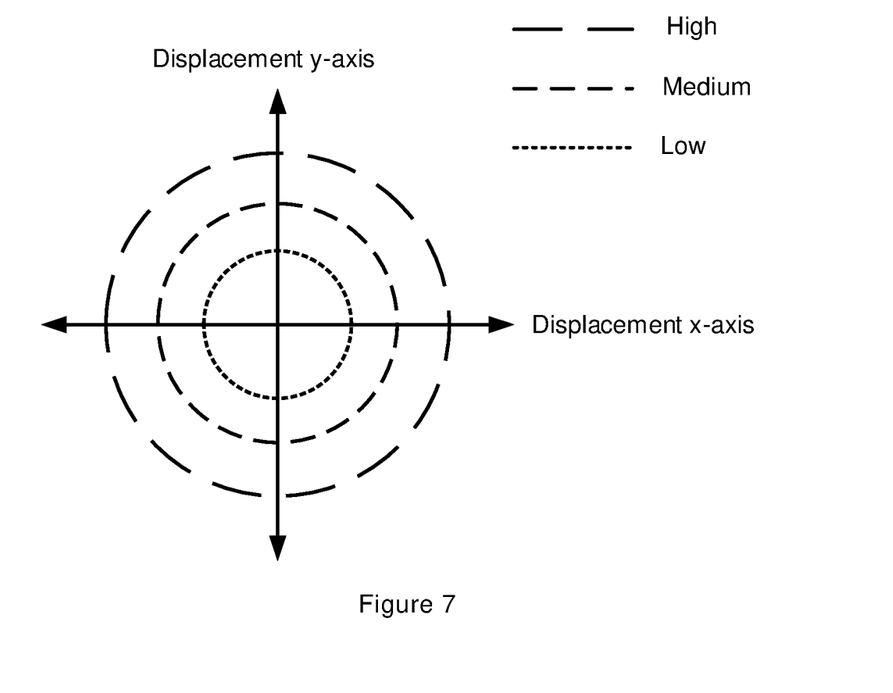
FIG. 7 shows collision thresholds from sensors with high, medium and low sensitivity levels.

In one embodiment, the at least one controller 130 may further be configured to adapt the collision threshold in accordance with a dynamically scaled limit. In another embodiment, the at least one controller 130 may further be configured to adapt the collision threshold in accordance with preset levels, as illustrated in FIG. 7. The collision threshold may accordingly have predefined profiles, like low, medium and high sensitivity. According to this embodiment, the collision threshold may be adapted in accordance with the predefined profiles. If the at least one controller 130 receives input data relating to the speed of the robotic work tool 100, and this input data comprises information about a high speed. The robotic work tool 100 may want to react quickly upon information regarding collisions and the collision threshold may be adjusted to be set in accordance with the high sensitivity profile.

In one advantageous embodiment, the robotic work tool 100 may be a robotic lawn mower.

According to a second aspect, there is provided a method implemented in the robotic work tool system 100 according to the first aspect. The method will be described with reference to FIG. 8.

Figure 8:
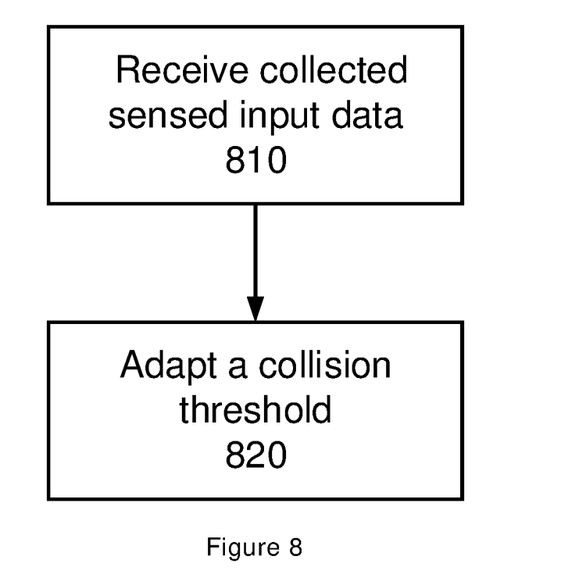
FIG. 8 shows a flowchart of an example.

In one embodiment, the method 800 may be for use in a robotic work tool 100. The robotic work tool 100 comprises a chassis 110 and a body 120. The method comprises the step 810 of receiving, from at least one input unit 170, 180, input data relating to the operation of the robotic work tool 100 and the step 820 of adapting, by at least one controller 130, a collision threshold based on said input data relating to the operation of the robotic work tool 100. The collision threshold is related to a movement of the chassis 110 with respect to the body 120 detected by at least one collision sensor arrangement 170, 180.

In a further aspect, the present disclosure relate to a robotic work tool 100 comprising a chassis 110 and a body 120. The robotic work tool 100 further comprises at least one collision sensor arrangement 140 for detecting a direction of a movement of the chassis 110 with respect to the body 120. The movement is indicative of a collision. The robotic work tool 100 further comprises at least one controller 130 for controlling operation of the robotic work tool 100. The at least one controller 130 is configured to receive, from the at least one collision sensor arrangement 140, a reference collision value. The reference collision value is representative of a position of the chassis 110 with respect to the body 120 when no movement is detected. The at least one controller 130 is further configured to set a collision threshold with reference to said reference collision value. The collision threshold is related to a movement of the chassis 110 with respect to the body 120 detected by the at least one collision sensor arrangement 140.

According to the proposed embodiment, the collision threshold may be set to reflect if the body 120 and the chassis 110 of the robotic work tool 100 are not completely in line with each other at an initial state. The detection of collisions may thus compensate for these situations. With reference to the example illustrated in FIG. 3, this means that the collision threshold may be set at an appropriate distance with regard to the body 120 and the chassis 110. By this, possible mechanical tolerance issues, faults in the at least one collision sensor arrangement 140, may be sorted out. Thus, the proposed robotic work tool 100 provides a way of calibrating the collision threshold in order to reduce potential error factors and a robotic work tool 100 with improved collision handling is provided.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc. Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. Still further, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

The invention claimed is:

1. A robotic work tool comprising:
   a chassis and a body;
   at least one input unit for receiving input data relating to an operation of the robotic work tool;
   at least one collision sensor arrangement for detecting a direction of a movement of the chassis with respect to the body, wherein the movement is indicative of a collision; and
   at least one controller for controlling operation of the robotic work tool, wherein the at least one controller is configured to:
   receive, from the at least one input unit, said input data relating to the operation of the robotic work tool; and
   adapt a collision threshold based on said input data relating to the operation of the robotic work tool, wherein the collision threshold is related to said movement of the chassis with respect to the body detected by the at least one collision sensor arrangement.

2. The robotic work tool according to claim 1, wherein the at least one controller further is configured to:
   receive, from the at least one collision sensor arrangement, a reference collision value, wherein the reference collision value is representative of a position of the chassis with respect to the body when no movement is detected; and
   set the collision threshold based on said reference collision value.

3. The robotic work tool according to claim 2, wherein the at least one controller further is configured to receive the reference collision value only upon reception of an activation signal.

4. The robotic work tool to claim 1, wherein the at least one controller further is configured to:
   receive, from the at least one collision sensor arrangement, the direction of the movement of the chassis with respect to the body, and
   determine that a collision has been detected by comparing the relative movement of the body and the chassis to the collision threshold.

5. The robotic work tool according to claim 4, wherein the at least one controller is further configured to:
   control the robotic work tool to navigate from a location where a collision was detected based on the direction of the movement of the body with respect to the chassis.

6. The robotic work tool according to claim 1, wherein the robotic work tool comprises at least two collision sensor arrangements for detecting a direction of a movement of the chassis with respect to the body.

7. The robotic work tool according to claim 6, wherein at least one sensor of the at least two collision sensor arrangements is located in a front part of the robotic work tool and wherein at least another sensor of the at least two collision sensor arrangements is located in a rear part of the robotic work tool.

8. The robotic work tool according to claim 6, wherein the at least two collision sensor arrangements are configured to have different collision thresholds and wherein the at least one controller is configured to adapt the collision threshold for each of the at least two collision sensor arrangements independently.

9. The robotic work tool according to claim 1, wherein the robotic work tool comprises at least two input units for receiving different respective types of input data relating to the operation of the robotic work tool and wherein the at least one controller is configured to adapt the collision threshold based on a combination of said input data relating to the operation of the robotic work tool from said at least two input units.

10. The robotic work tool according to claim 1, wherein the at least one input unit is a memory for receiving a preset input data.

11. The robotic work tool according to claim 1, wherein the at least one input unit is a sensor input unit for collecting sensed input data.

12. The robotic work tool according to claim 1, wherein the input data relating to an operation of the robotic work tool is representative of a speed of the robotic work tool and/or a property of a work area, such as the property of the work area including a grass height, a slope inclination, and/or a measure of flatness of the terrain.

13. The robotic work tool according to claim 1, wherein the at least one controller is further configured to adapt the collision threshold in accordance with a dynamically scaled limit.

14. The robotic work tool according to claim 1, wherein the at least one controller is further configured to adapt the collision threshold in accordance with preset levels.

15. The robotic work tool according to claim 1, wherein the robotic work tool is a robotic lawnmower.

16. A method for use in a robotic work tool comprising a chassis and a body,
    the method comprising:
    receiving, from at least one input unit, input data relating to the operation of the robotic work tool; and
    adapting, by at least one controller, a collision threshold based on said input data relating to the operation of the robotic work tool, wherein the collision threshold is related to a movement of the chassis with respect to the body detected by at least one collision sensor arrangement.

17. A robotic work tool comprising:
    a chassis and a body;
    at least one collision sensor arrangement for detecting a direction of a movement of the chassis with respect to the body, wherein the movement is indicative of a collision; and
    at least one controller for controlling operation of the robotic work tool, wherein the at least one controller is configured to:
    receive, from the at least one collision sensor arrangement, a reference collision value, wherein the reference collision value is representative of a position of the chassis with respect to the body when no movement is detected;
    set a collision threshold with reference to said reference collision value, wherein the collision threshold is related to a movement of the chassis with respect to the body detected by the at least one collision sensor arrangement.

\* \* \* \* \*

UNITED STATES PATENT AND TRADEMARK OFFICE
CERTIFICATE OF CORRECTION

PATENT NO. : 12,279,549 B2  
APPLICATION NO. : 17/431926  
DATED : April 22, 2025  
INVENTOR(S) : Dan Liljedahl et al.

Page 1 of 1

It is certified that error appears in the above-identified patent and that said Letters Patent is hereby corrected as shown below:

In the Claims

In Column 13, Claim 4, Line 48, "tool to claim 1" should read -- tool according to claim 1 --

In Column 14, Claim 12, Line 28, "area, such as the property" should read -- area, the property --

Signed and Sealed this  
Fifteenth Day of July, 2025

Coke Morgan Stewart  
*Acting Director of the United States Patent and Trademark Office*